Nov. 29, 1932.  A. CAMPBELL  1,889,170
CAR CONSTRUCTION
Filed July 28, 1930  3 Sheets-Sheet 1
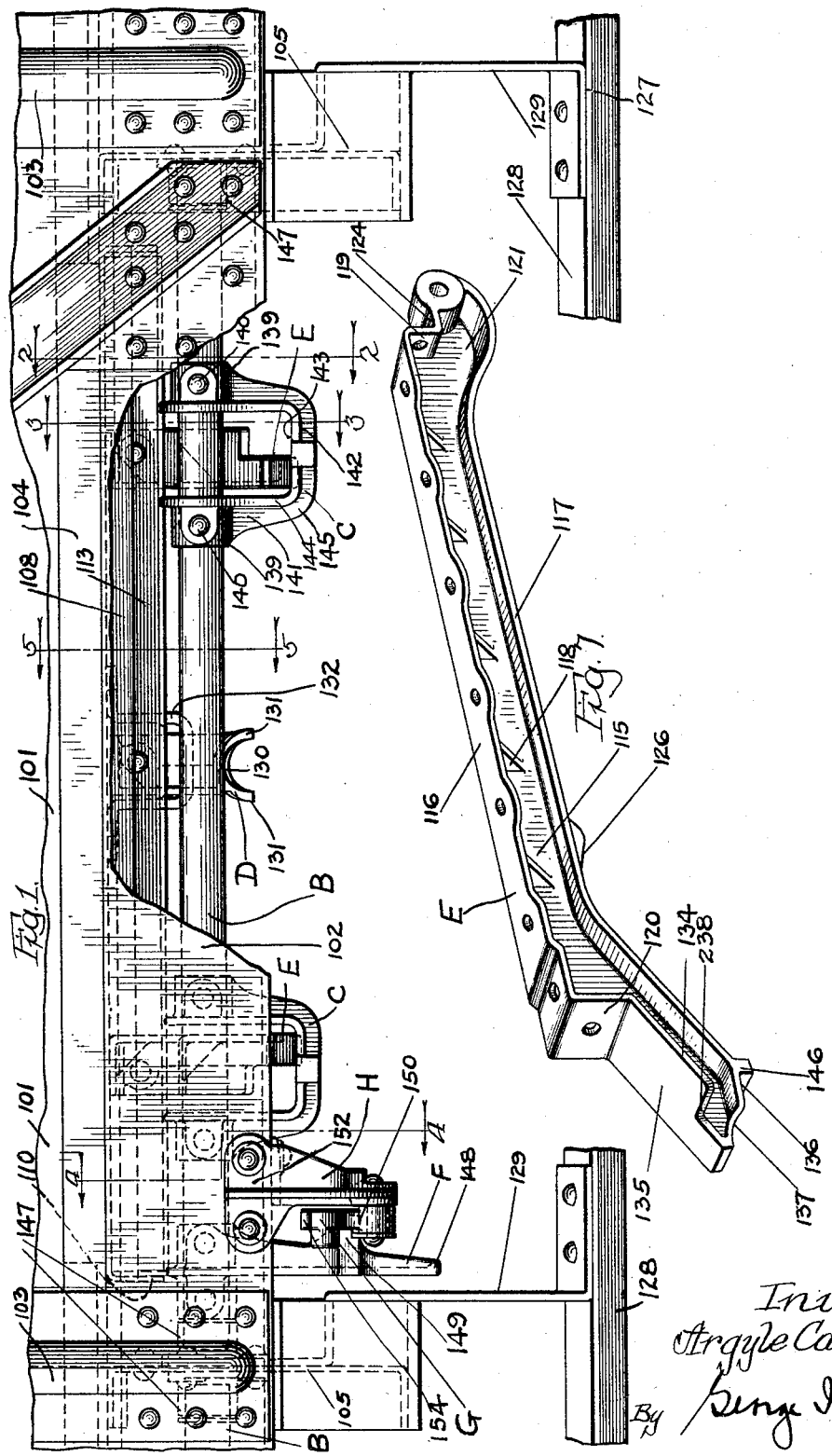

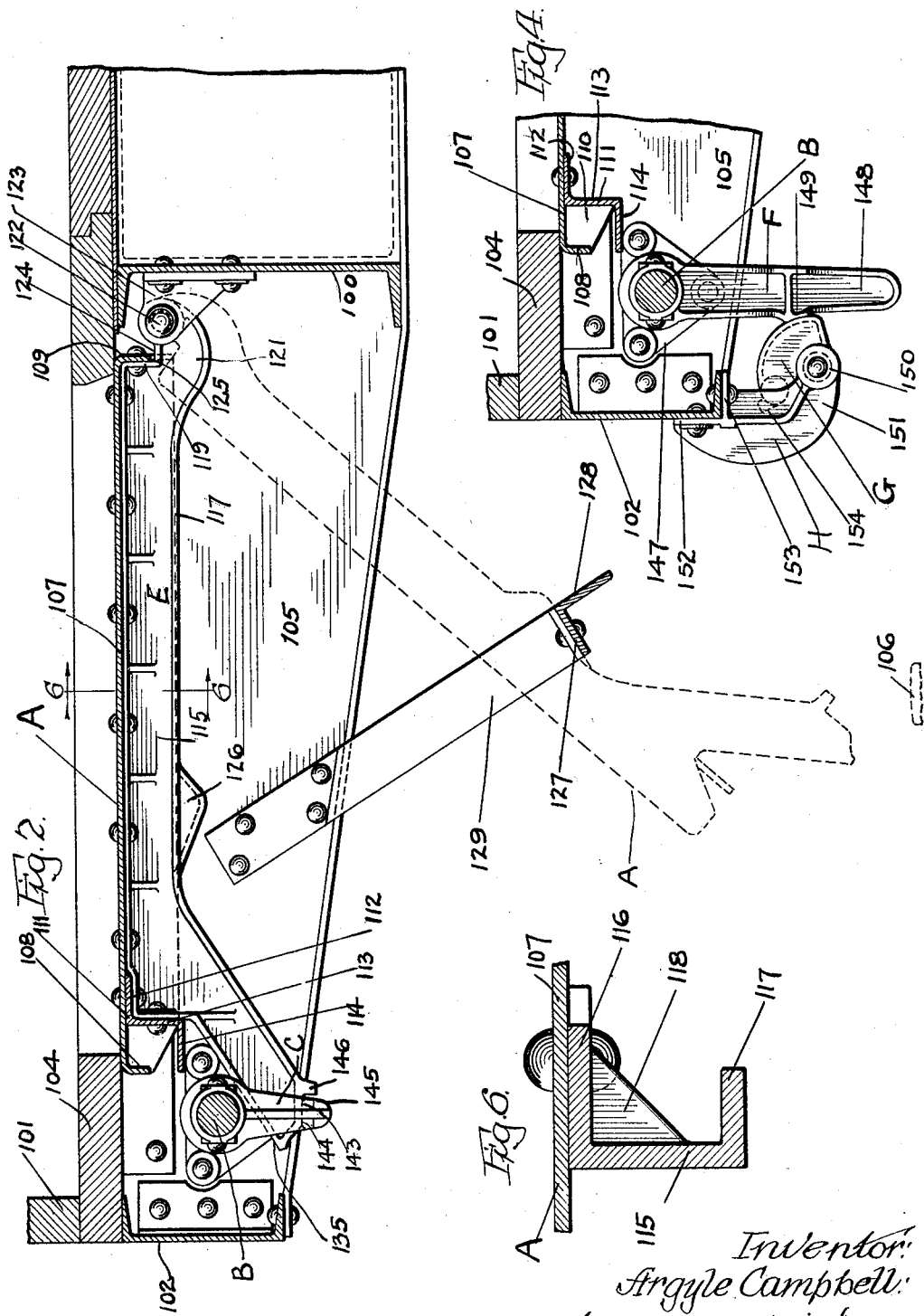

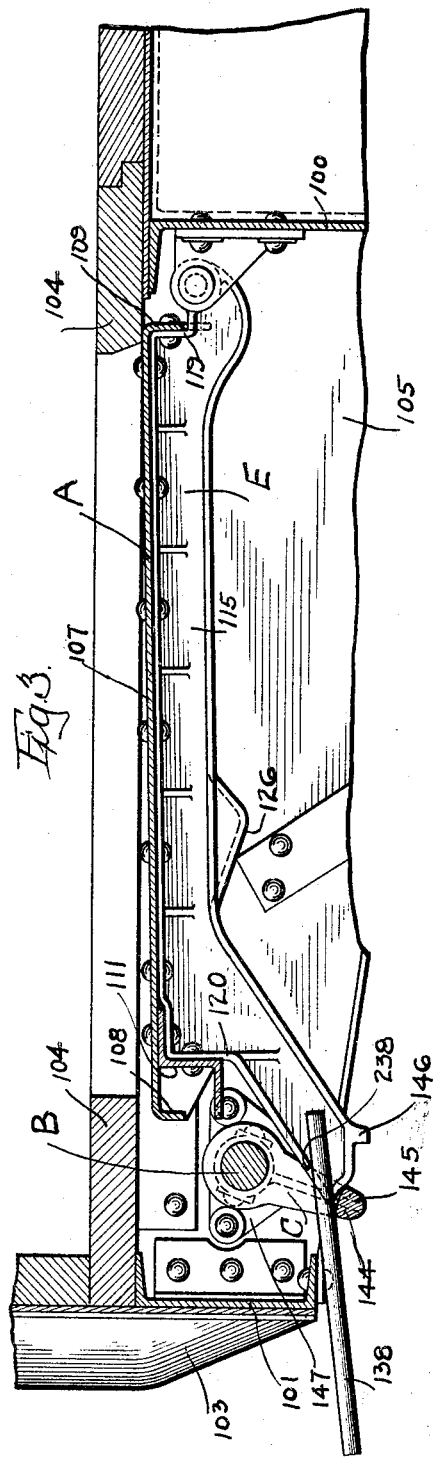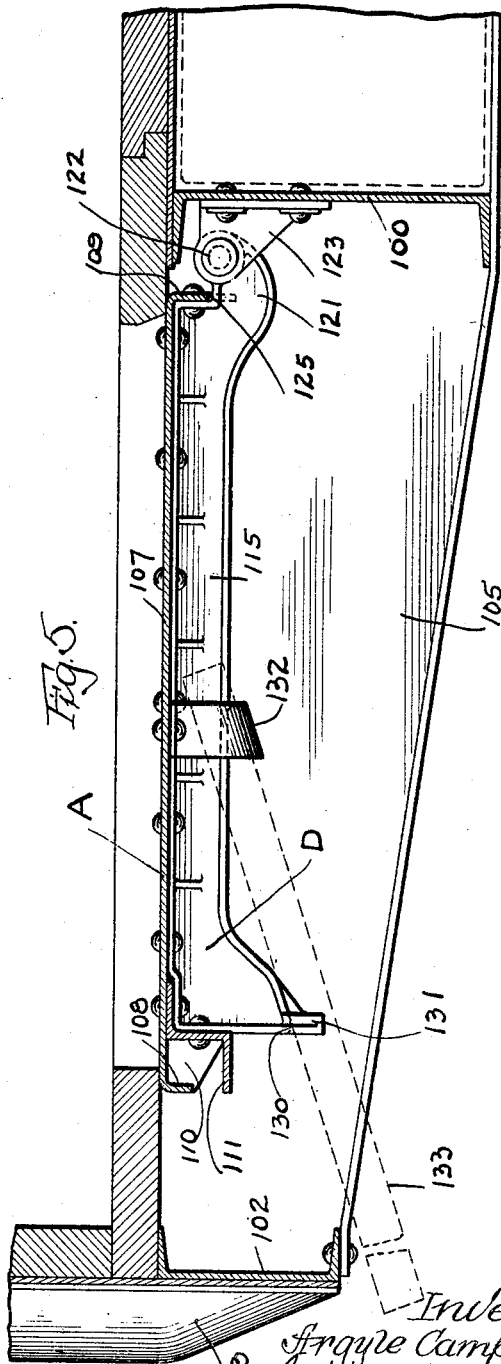

Patented Nov. 29, 1932

1,889,170

UNITED STATES PATENT OFFICE

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS

CAR CONSTRUCTION

Application filed July 23, 1930. Serial No. 471,276.

This invention relates to improvements in dump car construction.

An object of my invention is to provide a dump door and door locking means therefor, composed of relatively few parts and adapted to provide safety and convenience for an operator in releasing the door and lading.

Another object of my invention is to provide a dump car door having integral door hinge braces extending clear across the door and beyond the edges thereof, one of said ends cooperating with a door hinge bracket and the opposite end cooperating with door retaining means.

Still another object of my invention is to provide an integral door beam member having a portion fashioned to cooperate with door retaining means and having portions to connect with the body of the door and door bracing to provide strength in the general direction of the door and transversely thereto.

A more specific object of my invention is to provide a dump door construction and operating means for a car having a door located behind a side sill whereby such door may be conveniently operated from a position outwardly of the side sill.

A still more specific object of my invention is to provide a dump door construction and door operating means for a door located behind a side sill of a car whereby said door may be directly lifted to a closed or nearly closed position and to provide convenient means for the retention of a removable door lifting tool in a position such as will provided convenience and increased leverage to the operator and still not interfere with the side sill or door locking means as the door approaches closed position.

My invention further resides in certain details of construction and other features such as will be more fully pointed out hereinafter.

My improvements are shown as embodied in a car of the type commonly known as a gondola car, in which the construction of the car includes longitudinally extending side sill members at the sides of the car disposed below the floor line and extending below the floor level. This car is also provided with a series of floor doors hinged adjacent to the longitudinal center of the car and opening outwardly to discharge to the sides of the car.

For further comprehension of my invention reference may be had to the accompanying drawings wherein:

Fig. 1 is a vertical side elevational view of as much of a car as necessary to illustrate one dumping door, the door locking mechanism and the car construction identified therewith, certain portions of the side sill being cut away to more clearly illustrate the parts. It is understood that a plurality of doors will generally be incorporated on each side of the car, but inasmuch as the construction is the same for all doors the description and drawings will be confined to one door.

Fig. 2 is a vertical transverse sectional view taken substantially on the line 2—2 of Fig. 1, the door being indicated in the open position by dotted lines.

Fig. 3 is a vertical transverse sectional view on the line 3—3 of Fig. 1, illustrating the door in partly closed position.

Fig. 4 is a vertical transverse sectional view on the line 4—4 of Fig. 1.

Fig. 5 is a vertical transverse sectional view taken through the door substantially on the line 5—5 of Fig. 1.

Fig. 6 is a detail section on a line 6—6 through one of the hinge beams shown in Fig. 2.

Fig. 7 is a detail perspective view of one of the door braces.

In the drawings 100 indicates the centersills of the car, 101 the side walls, 102 the side sills, 103 the side stakes, 104 the floor of the car, and 105 the cross beam members. The cross beam members are spaced from each other lengthwise of the car and dumping doors A are interposed between said cross beams. Each cross beam generally includes a pan shape diaphragm extending between the centersills 100 and the side sills 102 of the car, the latter preferably being of channel shape and disposed below the floor of the car. One of the rails on which the car is adapted to travel is indicated at 106.

Extending between the pair of cross beams and carried thereby is a door retaining mechanism, said mechanism broadly including an operating shaft B, Fig. 1, and a pair of loops C rigidly mounted on said shaft, said loops cooperating with the doors to maintain the same in closed position in a manner to be described hereinafter.

Each door A preferably consists of a metallic plate 107 flanged at its front, rear and side edges as indicated at 108, 109 and 110, respectively. The door is rigidified on its underside by a beam member 111 extending along the outer edge of the door, and other beam members, indicated at D and E respectively, said last named members extending crosswise of the beam member 111. The beam member 111 is preferably formed Z-shape, with one flange 112 secured to the main body of the door. The web 113 of the beam depends from the door, and the other flange 114 extends from the web towards the outer edge of the door.

The beams D and E are preferably formed of cast metal thereby insuring proper distribution of metal and providing a construction conducive to light weight and strength. There are preferably two beams E for each door respectively disposed adjacent each side edge of the door in alignment with the respective loops C. The beam D is disposed intermediate the pair of beams E. The beams E extend beyond the outer edge of the door and across the plane of the Z-shaped beam 111 for cooperation with the door retaining means.

The said braces D and E are preferably channel formation in cross section, Figs. 6 and 7, and each includes a vertically disposed web 115 and upper and lower flanges 116 and 117, respectively, the former being of extended area in order to present sufficient surface to permit of securing the same to the main body of the door. The lower flange 117 is only of sufficient width to provide necessary area for the required strength and is of lesser width than the upper flange. The upper flange 116 is braced relatively to the web 115 by a series of integral braces 118. The web 115 and upper flange 116 are united at each end by integral transverse wall sections 119 and 120, respectively, the former being secured to the rear flange 109 of the door and the latter to the web 113 of the Z-shaped beam member 111. The end walls, in conjunction with the web 115 and upper flange 116, present a well braced body section for the beams, having strong corners which fit snugly in the angle of the box shape formed by the body of the door and the depending front and rear marginal flanges which are defined by the web 113 of the Z-bar and the rear flange 109, and this structure effectively secures the door members against racking.

Each said brace D and E adjacent the rear edge of the door is provided with a downwardly and rearwardly projecting portion 121 extending beyond the rear flange 109 of the door and there adapted to receive a hinge pivot 122 supported by hingebutts 123, secured to the centersill 100. The rearwardly projecting portion of each beam is articulated as indicated at 124 at the intersection with the door flange 109, and the door flange 109 in turn has a cutaway recess 125 (Figs. 2 and 5), for a portion of its depth, said recess being of sufficient width to straddle the associated door brace and thus provide a saddle joint effect at the junction of said door flange and door brace. This construction, providing as it does for continuous intersecting members of substantial depth as presented by the door flange and door braces, provides for continuity of reinforcement both longitudinally and transversely of the door.

The door arms are each provided with an integral bracket portion 126 adapted to engage with door stop means 127 when the door is opened. Said stop means preferably includes an angle shaped member 128 extending lengthwise of the car beneath the doors and supported from the cross-beams by suitable brackets 129.

The intermediate brace D adjacent the outer end of the door is extended downwardly for an appreciable distance below the Z-shape reinforcing member 111 and is formed with a seat 130, Fig. 1, preferably of concave shape with depending lugs 131 at each side, thereby forming an open pocket which, in conjunction with a loop member 132, is adapted to retain a removable bar, as indicated at 133, in fixed relation to the door for the purpose of presenting an extension lifting handle whereby the door may be conveniently lifted from the open position. The loop 132 which forms a pocket is preferably disposed so as to straddle the intermediate portion of the door beam D, as indicated on the drawings, Fig. 1. The relation of the seat 130 and loop 132 is such as to dispose the bar at a suitable downward angle and space the same clear of the operating shaft B and the lower portion of the side sill 102 when the door approaches the closed position.

Adjacent the front edge of the door, the door braces E are each formed with a downwardly and forwardly inclined portion 134, presenting on its upper side a face portion 135 adapted to engage with and displace the associated loop C out of the path of the door arm, it being understood that the weight of the loops cause the same to gravitate to a substantially normal door locking position.

The lower face of the door brace E is formed with a seating portion 136 preferably disposed in a vertical line beneath the axis of the door operating shaft B when the door is in closed position. The seating portion 136 is spaced appreciably from the outer end of the arm. Extending upwardly and outwardly from the said seating portion there is an inclined face 137 which presents a bevel approach to the main seating face 136 and is so related thereto and to the associated loop C as to permit of engagement between the loop and door brace and the retention of the door by the loops in a nearly closed position, whereby a wedging action may be effected between the loop and door brace to force the door tightly closed by partial rotation of the shaft. The face 137 may be slightly concave as indicated, or it may be a plane surface.

In doors of this character it is usual to space the arms lengthwise of the door an appreciable distance and consequently any tendency for one of the ends of the doors to sag or warp might bring about a condition where one of the door arms would be in engagement with its loop and the other arm out of engagement with its loop. Under such circumstances a removable bar 138, Fig. 3, could be inserted between the lower portion of the loop and under the upper flange of the door arm and a lifting movement of the door initiated, said lifting movement also effecting rotation of the shaft and completing the raising and locking of the door in one movement of the bar 138.

In order to provide the necessary space for the insertion of the bar or suitable operating tool 138 in the manner above described, the wide upper flange terminates an appreciable distance away from the extreme outer edge of the door brace, as indicated at 238, Fig. 7, thereby presenting an overhanging ledge at an appreciable distance above the lower seating face 136.

The loops C—C are each formed with a plurality of sleeve portions 139 spaced from each other lengthwise of the shaft. These sleeves fit over the shaft B and are rigidly united therewith by bolts or rivets 140, Fig. 1. The sleeve portions are extended downwardly to provide spaced arms 141—141 adapted to straddle the upper flange 116 of the brace beam E, and adjacent the lower portion of said beam there is an integral horizontal portion 142 which completes the loop and presents a bearing surface 143 adapted to cooperate with the seating portion 136 on the door brace. The respective vertical and horizontal portions 141 and 142 are preferably formed of T-shaped section, as indicated by walls 144 and 145. Adjacent the central portion of the horizontal portion the T-shape is rigidified by a rib which provides a substantially semi-circular portion for cooperation with the face portion 135 on the end of the door brace. Rearwardly of the loops there is disposed on each brace an integral depending lug portion 146 which forms a stop to limit inward movement of the loops.

The ends of the shafts B are extended to journal within brackets 147 carried by the respective cross-beam diaphragms 105. Adjacent one end of the shaft and intermediate one of the bearings and one of the loops there is rigidly associated with the shaft an operating handle F, Figs. 1 and 4, said handle being extended downwardly and formed with a handhold or grip 148. Intermediate the handhold and the shaft, the handle is provided with an integral laterally extending lug portion 149 adapted to be engaged by a suitable locking cam G to maintain the mechanism in normal locking position. This cam G is pivotally mounted on a lug 150 formed integrally with a downward extension 151 formed on a supporting bracket H. The bracket H is preferably mounted on the side sill 102 of the car and for this purpose is formed with angularly related walls 152 and 153, the former being secured to the web of the side sill channel and the latter to the lower flange thereof. In order to positively limit rotary movement of the cam G relatively to the handle, the cam is provided with an integral stop lug 154.

The door A, when in opened position, as indicated by dotted lines in Fig. 2, is supported by the door stops 127, the outer ends of the braces then being an appreciable distance above the rail 106. The arrangement of door brace thus permits the attainment of a steep floor slope when the door is in fully opened position without danger of having the door braces fouling the rail or other obstructions adjacent the rails. Furthermore, the sturdy construction of the door braces and door bracing reduces the liability of damaging the doors and braces through contact with the discharged lading. The door and door retaining mechanism have been shown as applied between one pair of cross-beams of the car, but it will be appreciated that the construction may be duplicated between other pairs of cross-beams adjacent to those shown in Fig. 1, the relation of the adjacent mechanism being shown on the left of Fig. 1, where the bearing 147 and a portion of the adjacent shaft B is indicated.

What I claim is:

1. As an article of manufacture in a dumping car door an integral reinforcing member having portions adapted to respectively cooperate with a door hinged butt and a door retaining device at the opposite ends of the door and having an intermediate portion adapted to cooperate with a door stop to receive the impact of the door, said portion cooperating with the door retaining means being formed with a door seat and a beveled face constituting a wedging approach to the door seat.

2. As an article of manufacture a door retaining arm having a portion fashioned to cooperate with door retaining means, said arm being of substantially channel shape with the web outstanding from the door and having one flange secured to the underside of the door, and the other flange spaced from the first named flange and forming a seat for cooperation with door retaining means, and integral braces connecting the upper flange with the web.

3. As a new article of manufacture, an element for a railway car door including a member incorporating in a one piece member a reinforcing brace having adjacent one end a hinge bracket and adjacent the opposite end a pocket adapted to receive a removable door lifting bar.

4. In a railway car having a dumping door, the combination of door retaining means including a shaft pivotally mounted beyond the free edge of the door with the axis thereof disposed below the floor of the door when the latter is in closed position; underbracing for the door including a pair of braces respectively disposed adjacent the opposite ends of the door, and an intermediate brace disposed between said pair of braces, said end braces being extended beyond the outer end of the door and cooperating with a door retaining means; and said intermediate brace having means adapted to accommodate a removable lifting bar and retain the same in definite relation with the main body of the door.

5. In a door, the combination of a body portion having a reinforcing member of appreciable depth extending along one edge, a brace member extending crosswise of the said reinforcing member and having a portion extended below the beam member and formed with a substantially concave seat adapted to form a bearing for the intermediate portion of a removable bar; and a loop member secured to the underside of the door at an appreciable distance from the said seat adapted to engage the end of the bar.

6. In a railway car door of the type adapted to be pivotally mounted adjacent one end thereof, the combination of a reinforcing brace extending at an angle to the hinge axis, said brace adjacent the free edge of the door having a depending portion formed with a seat adapted to straddle a removable door lifting bar; and a socket member carried by the door and adapted to engage one end of the bar and maintain the same against turning movement on the seat.

7. In a railway car having a door adapted to be pivotally mounted, a reinforcing and hinge member extending from the hinge end of the door towards the outer edge thereof, said member adjacent the outer edge of the door having a bearing formed with a pocket adapted to receive a removable door lifting bar and maintain the same against sidewise displacement; and a socket member disposed intermediate the pocket and the hinged end of the door for retaining one end of the removable bar.

8. In a railway car door of the type adapted to be pivotally mounted adjacent one edge thereof, the combination of reinforcing flanges respectively disposed adjacent the outer and rear edges of the door, said flanges with the main body of the door defining a channel shaped section; and integral door braces extending at an angle to the hinge axis of the door, said braces lying within the angle defined by the channel shaped door and formed of angular section with one wall secured to the undersurface of the door and having the adjacent flange normal to the main plane of the door, said braces having transverse wall sections adjacent the front and rear edges of the door, said wall sections being formed integrally with said respective walls of the angular section and respectively secured to the front and rear depending flanges of the door.

In witness that I claim the foregoing I have hereunto subscribed my name this 26th day of July, 1930.

ARGYLE CAMPBELL.